United States Patent [19]

Beffa et al.

[11] Patent Number: 4,904,767
[45] Date of Patent: Feb. 27, 1990

[54] ASYMMETRIC 1:2-CHROME COMPLEXES OF BENZENE-AZO-NAPHTHALENE/NAPHTHALENE-AZO-NAPHTHALENE ACID DYES FOR LEATHER

[75] Inventors: Fabio Beffa, Riehen; Alois Püntener, Rheinfelden; Peter Loew, Münchenstein, all of Switzerland

[73] Assignee: Ciba-Geigy Corporation, Arsdley, N.Y.

[21] Appl. No.: 68,815

[22] Filed: Jun. 29, 1987

Related U.S. Application Data

[63] Continuation of Ser. No. 491,616, May 4, 1983, abandoned.

[30] Foreign Application Priority Data

May 14, 1982 [CH] Switzerland .................. 3016/82
Jan. 12, 1983 [CH] Switzerland .................. 145/83
Jan. 12, 1983 [CH] Switzerland .................. 146/83

[51] Int. Cl.$^4$ .................. C09B 45/06; D06P 1/10; D06P 3/32; D06P 3/24
[52] U.S. Cl. .................. 534/696; 534/602; 534/722; 534/724; 534/840; 534/883
[58] Field of Search .................. 534/696

[56] References Cited

U.S. PATENT DOCUMENTS

| | | | |
|---|---|---|---|
| 1,887,602 | 11/1932 | Straub et al. | 534/696 X |
| 1,984,096 | 12/1934 | Straub et al. | 534/696 X |
| 2,906,746 | 9/1959 | Brassel et al. | 534/696 X |
| 3,041,827 | 6/1962 | Buehler et al. | 534/696 X |
| 3,516,980 | 6/1970 | Dore et al. | 534/696 X |
| 3,565,880 | 2/1971 | Jirou et al. | 534/696 X |
| 4,000,965 | 1/1977 | Mennicke et al. | 534/696 X |

FOREIGN PATENT DOCUMENTS

| | | | |
|---|---|---|---|
| 3010872 | 10/1981 | Fed. Rep. of Germany | 534/696 |
| 1220529 | 5/1960 | France | 534/696 |
| 222996 | 12/1968 | U.S.S.R. | 534/696 |
| 967011 | 8/1964 | United Kingdom | 534/696 |

OTHER PUBLICATIONS

AATCC Technical Manual-vol. 56, 1980, pp. 110 and 113.

*Primary Examiner*—Floyd D. Nigel
*Attorney, Agent, or Firm*—Wenderoth, Lind & Ponack

[57] ABSTRACT

Asymmetric 1:2-chrome complex dyes of the formula:

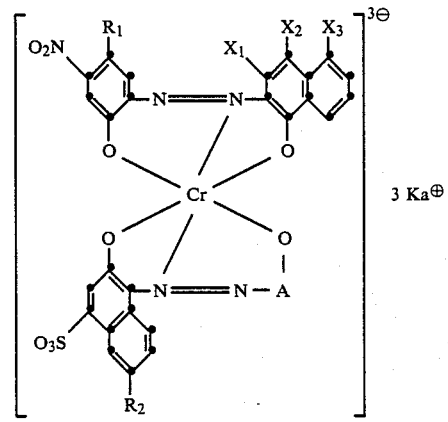

wherein
A is the radical of 1-hydroxynaphthalene or 2-hydroxynaphthalene,
$R_1$ is hydrogen, chlorine or methyl,
$R_2$ is hydrogen, nitro or chlorine, and
$Ka^+$ is a cation, and of the substituents $X_1$, $X_2$ and $X_3$ one is an $SO_3$ group, and the other two are hydrogen, $X_3$ being hydrogen when $R_1$ is chlorine and $R_2$ is hydrogen, give blue shades on leather and other polyamides, which shades are lightfast and fast to wet processing.

4 Claims, No Drawings

ASYMMETRIC 1:2-CHROME COMPLEXES OF BENZENE-AZO-NAPHTHALENE/NAPHTHALENE-AZO-NAPHTHALENE ACID DYES FOR LEATHER

This application is a continuation, of now abandoned application Serial No. 491,616, filed May 4, 1983, abandoned.

The invention relates to chrome complex dyes which correspond to the formula I

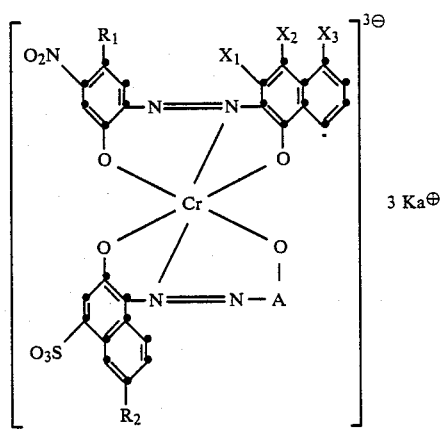

wherein

A is the radical of 1-hydroxynaphthalene or 2-hydroxynaphthalene, $R_1$ is hydrogen, chlorine or methyl, $R_2$ is hydrogen, nitro or chlorine, and $Ka^\oplus$ is a cation, and of the substituents $X_1$, $X_2$ and $X_3$ one is an $SO_3$ group, and the other two are hydrogen, $X_3$ being hydrogen when $R_1$ is chlorine and $R_2$ is hydrogen.

$Ka^\oplus$ is a cation, for example an alkali metal cation, such as lithium or potassium, or preferably sodium. In addition, $Ka^\oplus$ can be an ammonium cation, or the ammonium salt of an organic amine.

In preferred dyes of the formula I, $R_1$ is chlorine or in particular hydrogen.

$R_2$ is preferably hydrogen or nitro.

Of the substituents $X_1$, $X_2$ and $X_3$, one is an $SO_3$ group, and the other two are hydrogen. Preferred dyes are those in which one of the substituents $X_2$ and $X_3$ is an $SO_3$ group and the other is hydrogen.

Of special importance are compounds of the formula II

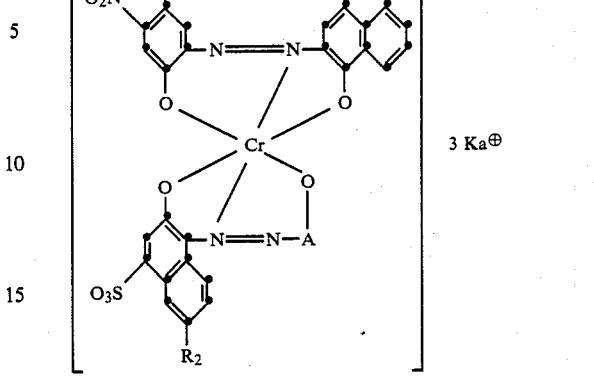

wherein

A is the radical of 1-hydroxynaphthalene or 2-hydroxynaphthalene, $R_1'$ is chlorine or especially hydrogen, $R_2$ is hydrogen or nitro, and $Ka^\oplus$ is a cation, and of the substituents $X_2$ and $X_3$ one is an $SO_3$ group, and the other is hydrogen, $X_3$ being hydrogen when $R_1'$ is chlorine, and $R_2$ is hydrogen.

The dyes according the invention can be produced by methods known per se, for example by producing the 1:1-chrome complex of a dye of the formula III

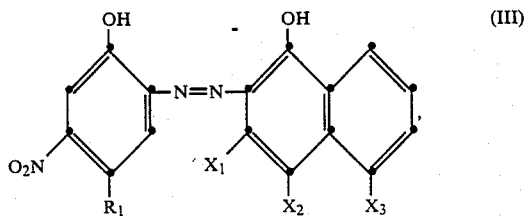

or of a dye of the formula IV

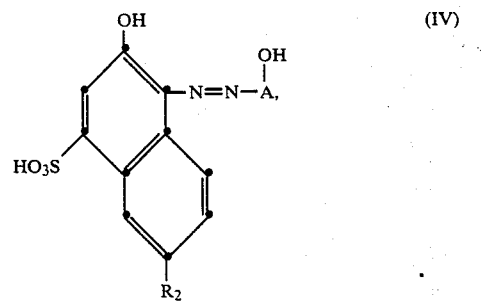

wherein $R_1$, $R_2$ and A have the meanings defined under the formula I, and of the substituents $X_1$, $X_2$ and $X_3$ one is an $SO_3H$ group, and the other two are hydrogen; and subsequently reacting this 1:1-chrome complex with the unmetallised dye of the formula IV or III.

The said 1:1-chrome complex is produced by methods known per se, preferably in an acid solution with chromium-III salts. The 1:1-chrome complex is then reacted, in a slightly acid, neutral or slightly alkaline medium, with the azo compound of the formula IV or III.

It is also possible to react a mixture of the azo dyes of the formulae III and IV with a chroming agent. There is formed in this case a mixture of 1:2-complexes which contains, besides the chrome complex of the formula I, the two symmetrical 1:2-complexes each having two molecules of the dye of the formula III or IV.

The novel chrome complex dyes of the formula I which are obtainable by the above process are isolated in the form of their salts, particularly alkali metal salts, especially sodium or lithium salts, or ammonium salts, or salts of organic amines having a positively charged nitrogen atom, and are suitable for dyeing and printing various materials, optionally in the presence of a levelling agent, above all however for dyeing and printing nitrogen-containing materials, such as silk or wool, and also synthetic fibres made from polyamides or polyurethanes, and especially leather.

Greyish-blue, blue or navy blue dyeings having good fastness properties, particularly good fastness to light and to wet processing, are obtained.

The preferred use of the dyes according to the invention is for the dyeing of wool and polyamide, and especially furs or leather, all types of leather being suitable, for example chrome leather, re-tanned leather or suede leather, of the goat, cow or pig.

The dyes according to the invention are above all suitable in the form of dye mixtures for the dyeing of leather, in particular in admixture with one or more suitable 1:2-metal complex dyes.

There is preferably used a dye mixture containing (a) a blue 1:2-metal complex of the above-given formula I, (b) a red or reddish-brown 1:2-chrome or -cobalt complex of the dye of the formula V

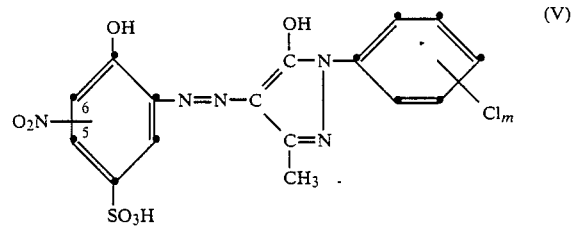

wherein m is an integer from 0 to 2, and the nitro group is arranged in the 5- or 6-position, and (c) a yellow 1:2-cobalt complex of the dye of the formula VI

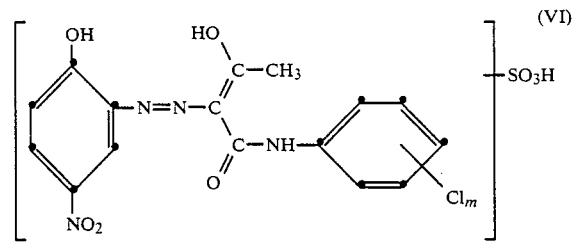

wherein m has the meaning defined above, or a yellowish-brown 1:2-cobalt or -chrome complex of the dye of the formula VII

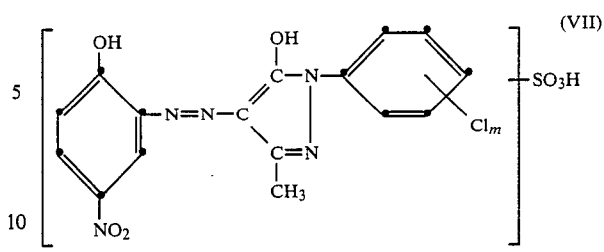

wherein m has the meaning defined above.

Compared with the nearest comparable known dye which was produced according to the French Patent Specification No. 1,220,529, Example 2 (1st dye in the Table), and which contains, instead of the sulfo group $X_1$, $X_2$ or $X_3$, a sulfo group in the 8-position of the α-naphthol group, the dyes according to the invention in which $X_2$ or $X_3$ is a sulfo group are distinguished by surprisingly better fastness to wet processing. Furthermore, they are better with respect to their fastness to acid at pH 3, a factor which is of importance especially in the dyeing of leather.

The following Examples serve to further illustrate the invention without its scope being limited by them. Parts are parts by weight, and percentages are per cent by weight.

EXAMPLE 1

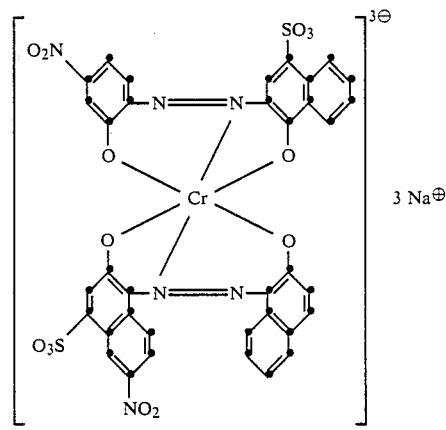

43.9 parts of the complex chromium compound of the type 1 atom of chromium : 1 molecule of dye (which contains 5.2 parts of chromium and 38.9 parts of monoazo dye formed from diazotised 5-nitro-2-amino-1-hydroxybenzene and 1-hydroxynaphthalene-4-sulfonic acid) and 43.9 parts of the monoazo dye formed from diazotised 6-nitro-1-amino-2-hydroxynaphthalene-4-sulfonic acid and 2-hydroxynaphthalene are heated in 800 parts of water to 95° C.; the mixture is then adjusted to pH 8 with sodium hydroxide, and is stirred at this temperature and this pH value until the starting products are no longer detectable. After the reaction is completed, the dye is isolated by spray drying. The dye obtained is in the form of a dark powder which dissolves in water to give a blue colour, and which dyes leather in navy blue shades having fastness to light.

EXAMPLE 2

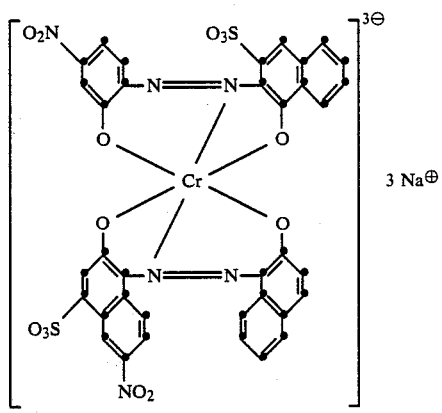

The 1:1-chrome complex containing 38.9 parts of the monoazo dye formed from diazotised 5-nitro-2-amino-1-hydroxybenzene and 1-hydroxynaphthalene-3-sulfonic acid as well as 5.2 parts of chromium is introduced into 500 parts of water, and 43.9 parts of the monoazo dye formed from diazotised 6-nitro-1-amino-2-hydroxynaphthalene-4-sulfonic acid and 2-hydroxynaphthalene are added; and the mixture is subsequently held, with stirring, at pH 7-7.5 and at 85°-90° C. until the formation of the asymmetric 1:2-complex dye is isolated by evaporation to dryness. The product obtained is in the form of a dark powder which dissolved in water to give a blue colour and which dyes leather in navy blue shades having fastness to light.

EXAMPLE 3

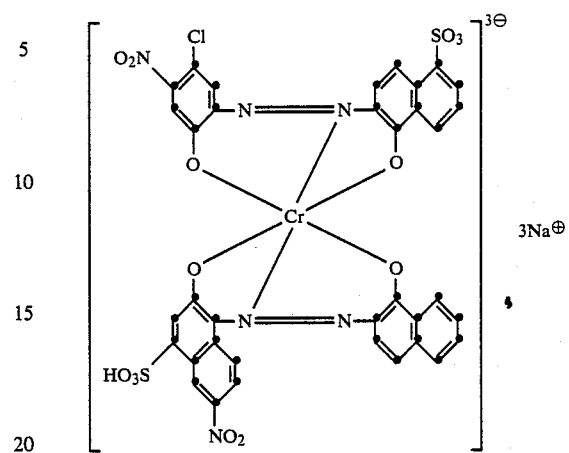

In 500 parts of water are suspended 48.9 parts of the complex chromium compound of the type 1 atom of chromium : 1 molecule of dye (which contains 5.2 parts of chromium and 43.9 parts of the monoazo dye formed from diazotised 6-nitro-1-amino-2-hydroxynaphthalene-4-sulfonic acid and 1-hydroxynaphthalene) with 42.4 parts of the monoazo dye formed from diazotised 5-nitro-4-chloro-2-amino-1-hydroxybenzene and 1-hydroxynaphthalene-5-sulfonic acid. The reaction mixture is heated to 90°-95° C.; the pH value is adjusted to 7-7.5 with sodium hydroxide, and the mixture is held at this temperature and at a constant pH value until the starting products have disappeared. After the reaction is finished, the dye is isolated by evaporation to dryness. The product is in the form of a dark powder which dissolves in water to give a blue colour, and which dyes leather in navy blue shades having fastness to light.

In the following Table are listed further dyes from which can be produced, according to the data given in Examples 1-3, other 1:2-chrome complexes. There are used in each case on of the dyes from either column I or column II as the 1:1-chrome complex, and the dye situated opposite in the Table as the unmetallised dye. The dyes obtained dye leather, wool and polyamide in greyish-blue, blue or dark blue to navy blue shades.

TABLE

| No. | I | II |
|---|---|---|
| 1 | (OH, OH, HO3S, NO2) naphthalene-azo-naphthol | (OH, OH, NO2, SO3H) naphthol-azo-naphthol |

TABLE-continued
| No. | I | II |
|---|---|---|
| 2 | 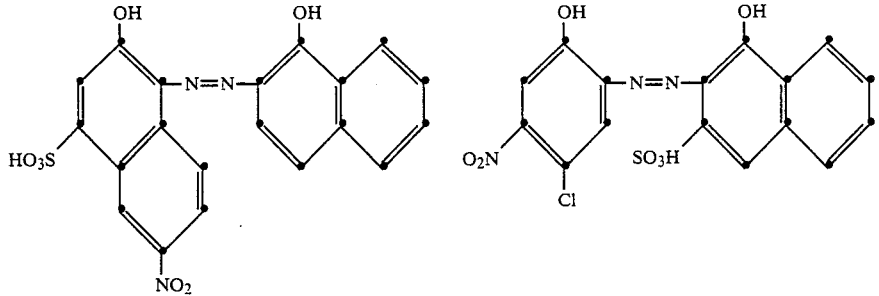 | 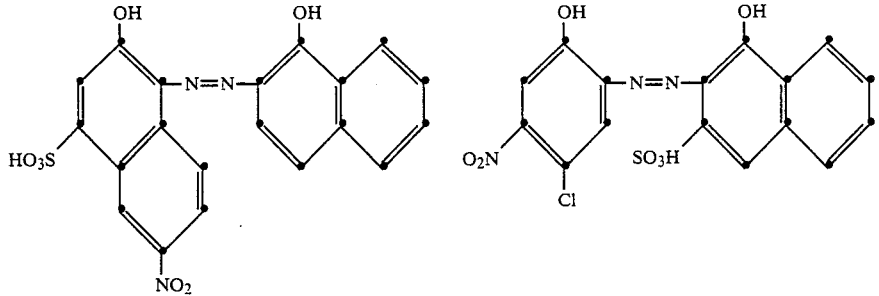 |
| 3 | 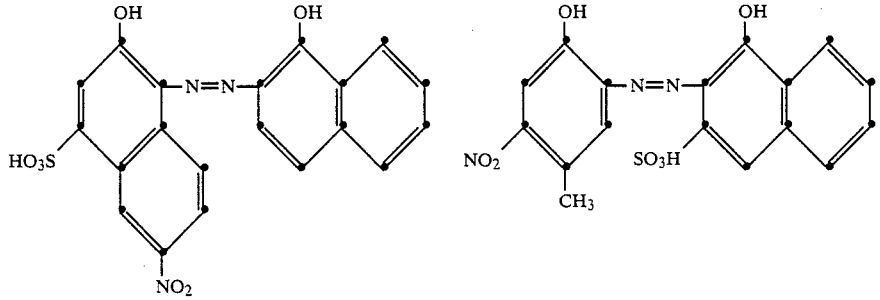 | 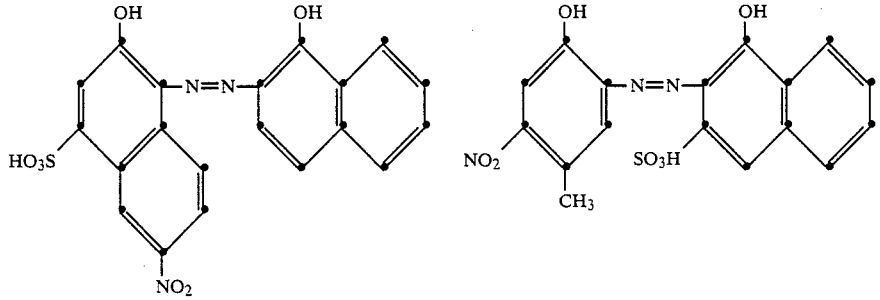 |
| 4 | 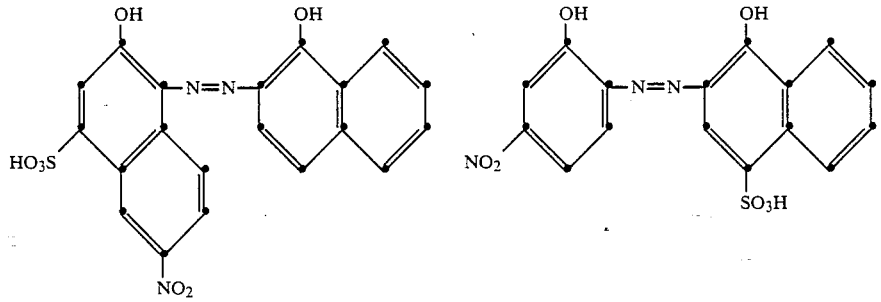 | 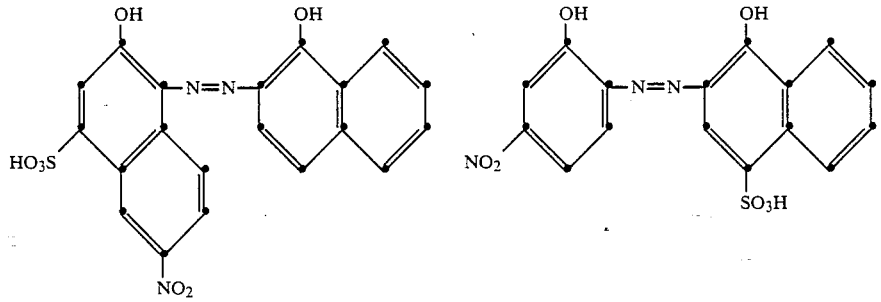 |
| 5 | 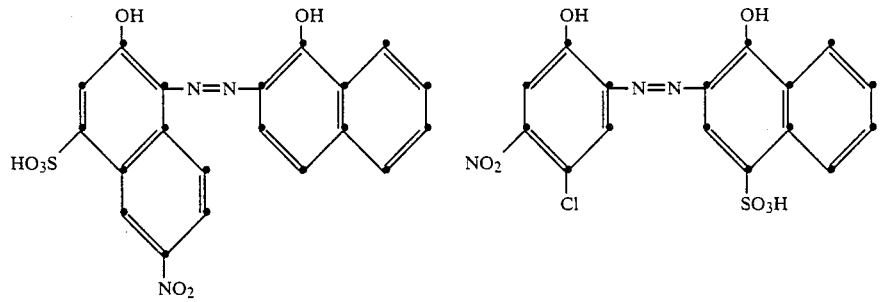 | 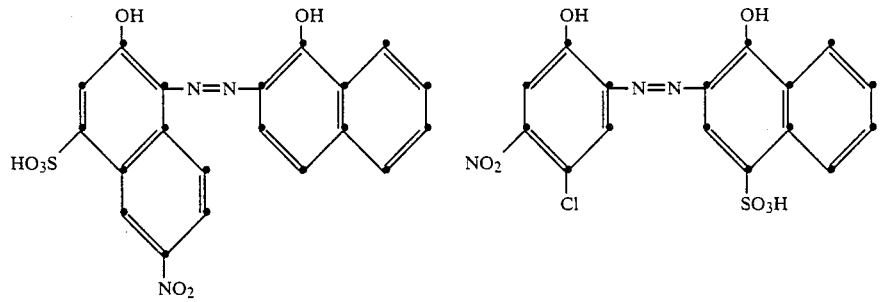 |
| 6 | 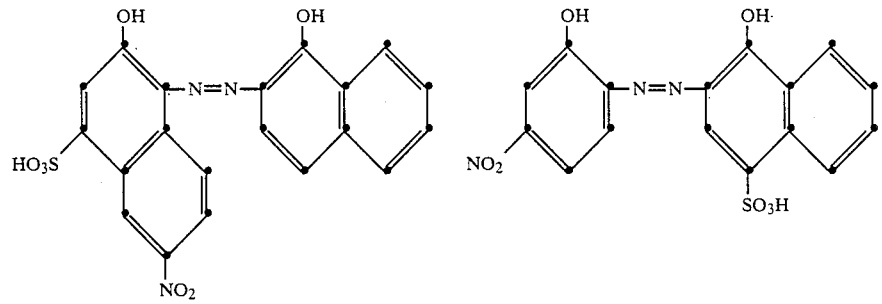 | 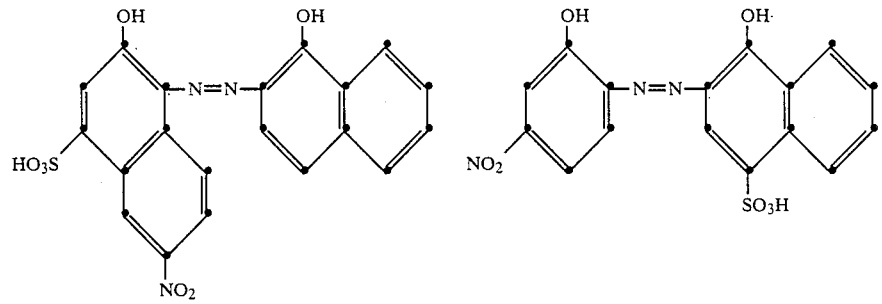 |

TABLE-continued

| No. | I | II |
|---|---|---|
| 7 | 1-(2-hydroxy-6-sulfo-4-nitro-naphthalen-1-ylazo)-2-hydroxynaphthalene | 1-(2-hydroxy-5-nitrophenylazo)-2-hydroxy-6-sulfo-naphthalene |
| 8 | 1-(2-hydroxy-6-sulfo-4-nitro-naphthalen-1-ylazo)-2-hydroxynaphthalene | 1-(2-hydroxy-5-nitro-4-methylphenylazo)-2-hydroxy-6-sulfo-naphthalene |
| 9 | 1-(2-hydroxy-7-sulfo-5-nitro-naphthalen-1-ylazo)-2-hydroxynaphthalene | 1-(2-hydroxy-5-nitro-4-chlorophenylazo)-2-hydroxy-6-sulfo-naphthalene |
| 10 | 1-(2-hydroxy-7-sulfo-5-nitro-naphthalen-1-ylazo)-2-hydroxynaphthalene | 1-(2-hydroxy-5-nitro-4-methylphenylazo)-2-hydroxy-6-sulfo-naphthalene |
| 11 | 1-(2-hydroxy-7-sulfo-5-nitro-naphthalen-1-ylazo)-2-hydroxynaphthalene | 1-(2-hydroxy-5-nitro-4-chlorophenylazo)-2-hydroxy-6-sulfo-naphthalene |

ભ
TABLE-continued

| No. | I | II |
|---|---|---|
| 12 | (structure: bis-naphthalene with OH, OH, azo, HO₃S, NO₂ substituents) | (structure: OH, OH, N=N, NO₂, CH₃, SO₃H) |
| 13 | (structure: bis-naphthalene with OH, OH, azo, HO₃S, NO₂ substituents) | (structure: OH, OH, N=N, NO₂, SO₃H) |
| 14 | (structure: bis-naphthalene with OH, OH, azo, HO₃S, NO₂ substituents) | (structure: OH, OH, N=N, NO₂, CH₃, SO₃H) |
| 15 | (structure: bis-naphthalene with OH, OH, azo, HO₃S, NO₂ substituents) | (structure: OH, OH, N=N, O₂N, Cl, SO₃H) |

EXAMPLE 4

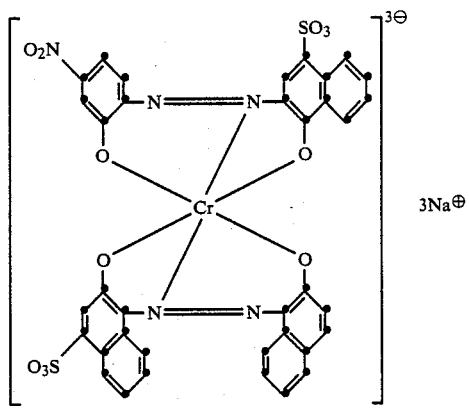

In 800 parts of water are suspended 44.4 parts of the complex chromium compound of the type 1 atom of chromium : 1 molecule of dye (which contains 5.2 parts of chromium and 39.4 parts of the monoazo dye formed from diazotised 1-amino-2-hydroxynaphthalene-4-sulfonic acid and 2-hydroxynaphthalene) with 38.9 parts of monoazo dye formed from diazotised 5-nitro-2-amino-1-hydroxybenzene and 1-hydroxynaphthalene-4-sulfonic acid. The reaction mixture is heated to 90°–95° C.; the pH-value is subsequently adjusted to 7.5–8 with sodium hydroxide, and the mixture is stirred until the starting products are no longer detectable. After completion of the reaction, the dye is precipitated by the addition of sodium chloride, and is then filtered off and dried. It is in the form of a dark powder which dissolves in water to give a blue colour, and dyes leather, polyamide or wool in blue shades having good fastness properties.

EXAMPLE 5

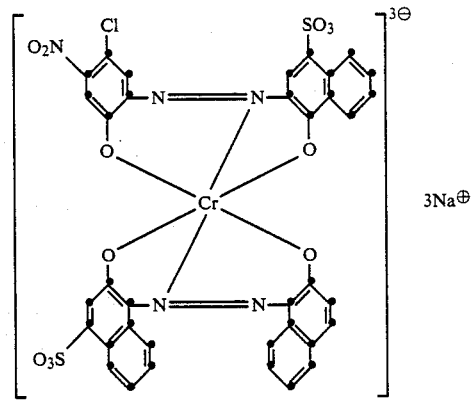

47.4 parts of the complex chromium compound of the type 1 atom of chromium : 1 molecule of dye (which contains 5.2 parts of chromium and 42.4 parts of a monoazo dye from diazotised 5-nitro-4-chloro-2-amino-1-hydroxybenzene and 1-hydroxynaphthalene-4-sulfonic acid) and 39.4 parts of the monoazo dye from diazotised 1-amino-2-hydroxynaphthalene-4-sulfonic acid and 2-hydroxynaphthalene are heated in 800 parts of water to 95° C.; the pH is adjusted to 8 with sodium hydroxide, and stirring is maintained a this temperature until the starting dyes are no longer detectable. After completion of the reaction, the dye of the above formula is precipitated by the addition of sodium chloride; it is then filtered off and dried. It is in the form of a dark powder which dissolves in water to give a blue colour, and dyes wool, polyamide and leather in blue shades having good fastness properties.

EXAMPLE 6

There are introduced into 800 parts of water 39.4 parts of the monoazo dye from diazotised 1-amino-2-hydroxynaphthalene-4-sulfonic acid and 2-hydroxynaphthalene as well as 38.9 parts of the monoazo dye from diazotised 5-nitro-2-amino-1-hydroxybenzene and 1-hydroxynaphthalene-4-sulfonic acid, and the mixture is heated to 80° C. The pH is adjusted to 7.5–8 at this temperature with sodium hydroxide, and a solution of the sodium salt of chromium salicylic acid containing 5.7 parts of chromium is added. The reaction solution is refluxed until metallisation is completed. The water is removed by evaporation to dryness or spray drying. The product is a dark powder which dissolves in water to give a blue colour, and dyes leather, polyamide and wool in blue to navy blue shades having good fastness properties. The dye is a mixture of the following metal complexes.

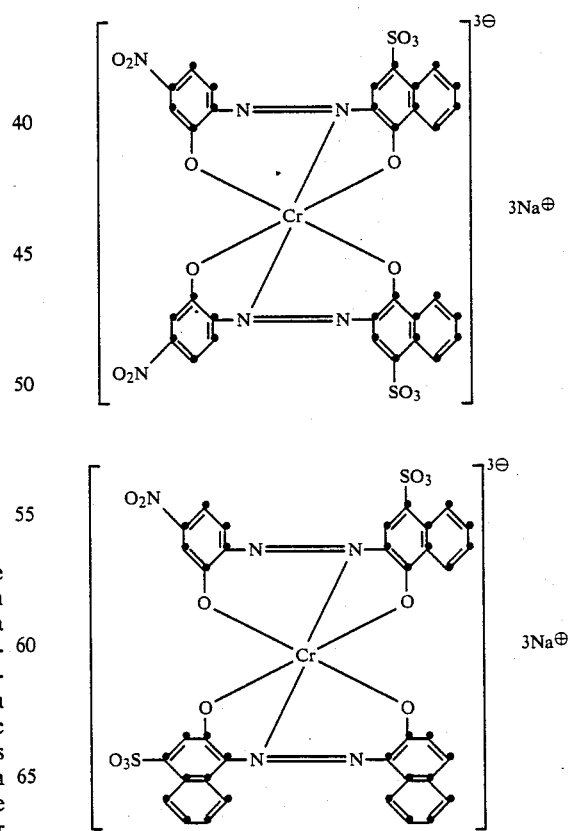

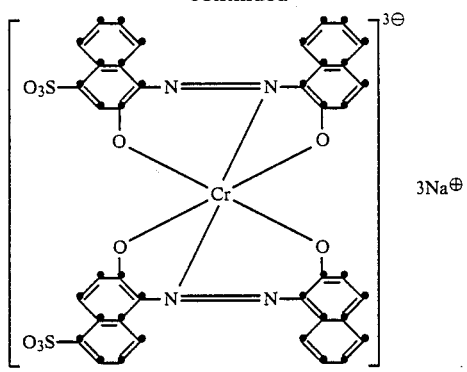

When the procedure is carried out as described in the foregoing except that there is used, instead of the sodium salt of chromium salicylic acid, an equivalent amount of cobalt acetate or cobalt sulfate, the result is a mixture of the cobalt complexes corresponding to the above formulae, which mixture dyes leather, polyamide or wool in reddish navy blue shades having good fastness properties.

In the following Table are listed further dyes from which can be produced, according to the data given in Examples 4–5, other 1:2-chrome complexes. There are used in each case one of the dyes from either column 1 or column II as the 1:1-chrome complex, and the dye situated opposite in the Table is the unmetallised dye. The 1:2-complex dyes dye leather, wool and polyamide in blue to navy blue shades having good fastness properties.

TABLE (dyes 1–4: column I and column II structures as depicted)

TABLE-continued

| No. | I | II |
|---|---|---|
| 5 | 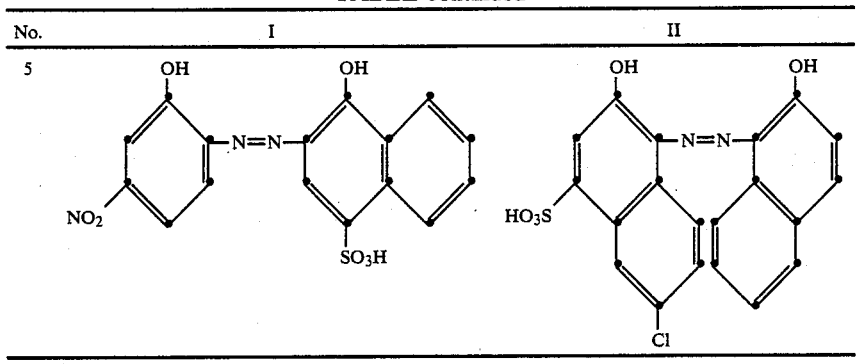 | |

EXAMPLE 7

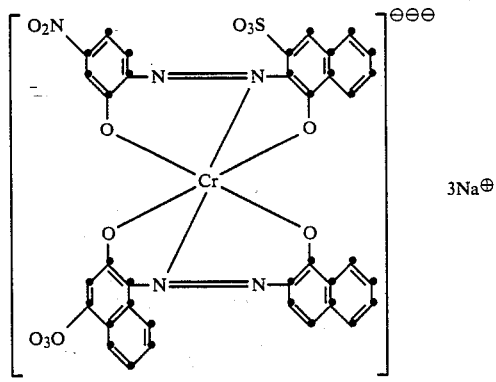

In 500 parts of water are suspended 44.4 parts of the complex chromium compound of the type 1 atom of chromium : 1 molecule of dye (which compound contains 5.2 parts of chromium and 39.4 parts of the monoazo dye formed from diazotised 1-amino-2-hydroxynaphthalene-4-sulfonic acid and 1-hydroxynaphthalene) with 38.9 parts of the monoazo dye formed from diazotised 5-nitro-2-amino-1hydroxybenzene and 1-hydroxynaphthalene-3-sulfonic acid. The reaction mixture is heated to 85°–90° C.; the pH-value is adjusted to 7.5–8 with sodium hydroxide, and stirring is maintained at this temperature and with this pH-value until the starting products are no longer detectable. After the reaction is completed, the dye is isolated by evaporation to dryness. The dye is in the form of a dark powder which dissolves in water to give a blue colour and which dyes leather in dark-blue shades.

EXAMPLE 8

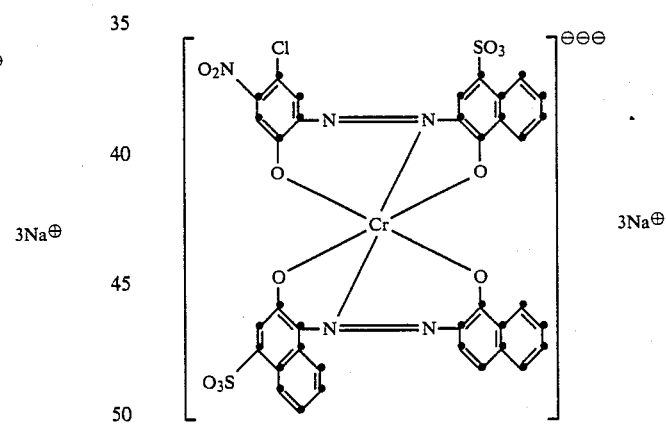

44.4 pats of the complex chromium compound of the type 1 atom of chromium : 1 molecule of dye (which compound contains 5.2 parts of chromium and 39.4 parts of monoazo dye formed from diazotised 1-amino-2-hydroxynaphthalene-4-sulfonic acid and 1-hydroxynaphthalene) and 42.4 parts of the monoazo dye formed from diazotised 5-nitro-4-chloro-2-amino-1-hydroxybenzene and 1-hydroxynaphthalene-4-sulfonic acid are heated in 750 parts of water to 80°–85° C.; the pH-value is adjusted to 7–7.5 with sodium hydroxide, and this temperature is maintained at a constant pH-value, with stirring, until the starting products have disappeared. After completion of the reaction, the water is removed by spray drying, the product obtained being in the form of a dark powder which dissolves in water to give a blue colour, and which dyes leather in dark-blue shades having good fastness to light.

EXAMPLE 9

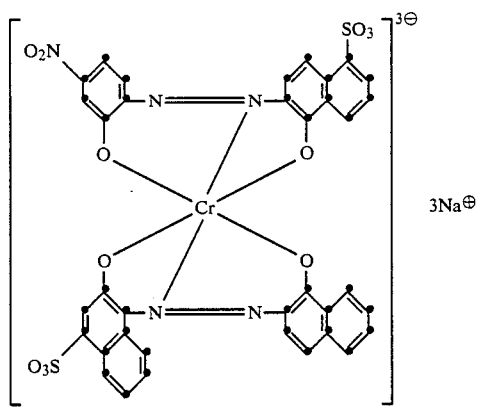

The 1:1-chrome complex which contains 39.4 parts of the monoazo dye from diazotised 1-amino-2-hydroxynaphthalene-4-sulfonic acid and 1-hydroxynaphthalene, as well as 5.2 parts of chromium, is introduced into 500 parts of water, and 38.9 parts of the monoazo dye from diazotised 5-nitro-2-amino-1-hydroxybenzene and 1-hydroxynaphthalene-5-sulfonic acid are added; the mixture is stirred at 80°–85° C. with a pH-value of 7–7.5 until the starting products are no longer detectable, and the product is then isolated by spray drying. It is in the form of a dark powder which dissolves in water to give a blue colour, and which dyes leather in dark-blue shades having fastness to light.

In the following Table are listed further dyes from which can be produced, according to the data given in Examples 7–9, other 1:2-chrome complexes. There are used in each case one of the dyes from either column I or column II as the 1:1-chrome complex, and the dye situated opposite in the Table is the unmetallised dye. The 1:2-complex dyes dye leather, wool and polyamide in greyish-blue, blue or dark-blue to navy blue shades.

TABLE

| No. | I | II |
|---|---|---|
| 1 | 1-hydroxy-2-(2-hydroxynaphthylazo)naphthalene with HO₃S on ring I | 4-nitro-5-chloro-2-hydroxyphenyl azo 2-hydroxynaphthalene with HO₃S |
| 2 | 1-hydroxy-2-(2-hydroxynaphthylazo)naphthalene with HO₃S | 4-nitro-2-hydroxyphenyl azo 2-hydroxynaphthalene-SO₃H |
| 3 | 1-hydroxy-2-(2-hydroxynaphthylazo)naphthalene with HO₃S | 4-nitro-5-methyl-2-hydroxyphenyl azo 2-hydroxynaphthalene-SO₃H |
| 4 | 1-hydroxy-2-(2-hydroxynaphthylazo)naphthalene with HO₃S and Cl | 4-nitro-5-chloro-2-hydroxyphenyl azo 2-hydroxynaphthalene-SO₃H |

TABLE-continued

| No. | I | II |
|---|---|---|
| 5 | (structure: 1-hydroxy-2-[(2-hydroxynaphthalen-1-yl)azo]-6-chloro-naphthalene-?-sulfonic acid with HO₃S and Cl substituents) | (structure: phenyl-azo-naphthalene with OH, OH, NO₂, Cl, SO₃H substituents) |
| 6 | (structure similar to 5 with HO₃S and Cl substituents on naphthalene) | (structure with OH, OH, NO₂, Cl, SO₃H substituents) |
| 7 | (structure with HO₃S on naphthalene) | (structure with OH, OH, NO₂, CH₃, HO₃S substituents) |
| 8 | (structure with HO₃S on naphthalene) | (structure with OH, OH, NO₂, CH₃, SO₃H substituents) |

DYEING INSTRUCTIONS FOR LEATHER 100 parts of suede leather for clothing (dry weight) are wetted back at 50° C. in a solution of 1000 parts by volume of water and 2 parts of 24% ammonia for 2 hours, and subsequently dyed at 60° C. in a solution of 1000 parts by volume of water, 2 parts of 24% ammonia and 6 parts of the dye from Example 2 for 1 hour. There is then added a solution of 40 parts by volume of water and 4 parts of 85% formic acid, and dyeing is performed for a further 30 minutes. The leather is subsequently well rinsed, and optionally further treated with 2 parts of a dicyandiamide/formaldehyde condensation product at 50° C. for 30 minutes.

Other suede leathers and also glove leathers can be treated in the same manner.

The dark-blue dyeings thus obtained are characterised by good fastness properties and a good covering capacity.

DYEING INSTRUCTIONS FOR POLYAMIDE 100 parts of polyamide knitting yarn are introduced at 50° C. into a dye bath containing, to 4000 parts of water, 2 parts of the dye of Example 4, 4 parts of ammonium sulfate and 2 parts of a levelling agent. The liquor is brought to boiling in the course of 45 minutes, and is held for a further 45 minutes at the boiling temperature. The dyed materials is thereupon removed, thoroughly rinsed with cold water and dried. The result is a polyamide which has been dyed blue and which has good fastness properties.

DYEING INSTRUCTIONS FOR WOOL 100 parts of wool knitting yarn are introduced into a dye bath at 50° C., which contains, to 4000 parts of water, 2 parts of the dye of Example 8, 4 parts of 80% acetic acid and 2 parts of a levelling agent. The dye liquor is brought to the boiling temperature in the course of 45 minutes, and is held at the boiling temperature for a further 45 minutes. The dyed material is thereupon removed, thoroughly rinsed with cold water and dried. A wool which is dyed in a greenish-blue shade and which has good fastness properties is obtained.

What is claimed is:

1. A metal-complex dye which corresponds to the formula I

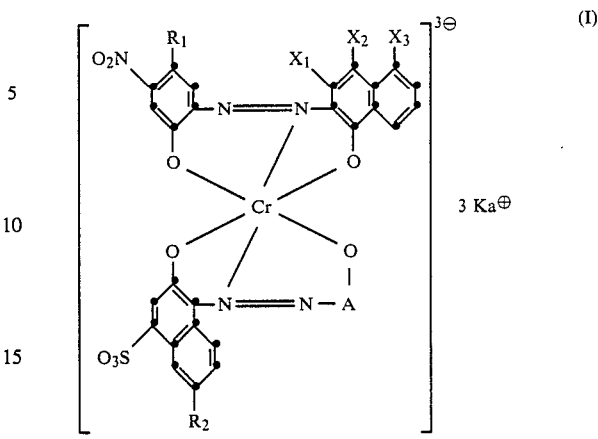

wherein
A is the radical of 1-hydroxynaphthalene or 2-hydroxynaphthalene,
$R_1$ is hydrogen, chlorine or methyl, $R_2$ is hydrogen, nitro or chlorine, and $Ka^\oplus$ is a cation, and of the substituents
$X_1$, $X_2$ and $X_3$, one is an $SO_3$ group, and the other two are hydrogen, $X_3$ being hydrogen when $R_1$ is chlorine and $R_2$ is hydrogen.

2. A dye according to claim 1, wherein $R_1$ is chlorine or hydrogen.

3. A dye according to claim 1, wherein one of the substituents $X_2$ and $X_3$ is an $SO_3$ group, and the other is hydrogen.

4. A dye of claim 2 wherein X is hydrogen.

* * * * *